(12) United States Patent
Funahashi

(10) Patent No.: US 7,054,472 B1
(45) Date of Patent: May 30, 2006

(54) IMAGE SENDING APPARATUS AND IMAGE TRANSMISSION INFORMATION DISPLAY APPARATUS

(75) Inventor: Takeshi Funahashi, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 838 days.

(21) Appl. No.: 09/686,371

(22) Filed: Oct. 12, 2000

(30) Foreign Application Priority Data

Oct. 12, 1999 (JP) ............................ 11/289681
Dec. 15, 1999 (JP) ............................ 11/356099

(51) Int. Cl.
G06K 9/00 (2006.01)

(52) U.S. Cl. ..................... 382/128; 382/276; 378/21
(58) Field of Classification Search ................ 382/100, 382/128, 129, 130, 131, 132, 133, 156, 181, 382/232, 255, 305, 274, 276; 250/484, 327.2, 250/328, 585, 586, 208.1; 358/482; 378/2, 378/21, 28; 348/14.12, 230.1
See application file for complete search history.

(56) References Cited

U.S. PATENT DOCUMENTS

| | | | | | |
|---|---|---|---|---|---|
| 4,258,264 | A | * | 3/1981 | Kotera et al. ................ | 250/585 |
| 4,346,295 | A | * | 8/1982 | Tanaka et al. ............... | 250/586 |
| 4,485,302 | A | * | 11/1984 | Tanaka et al. ............... | 250/585 |
| 4,723,074 | A | * | 2/1988 | Kimura ........................ | 250/589 |
| 4,760,256 | A | * | 7/1988 | Ohgoda et al. ............. | 250/588 |
| 4,994,662 | A | * | 2/1991 | Funahashi et al. ......... | 250/208.1 |
| 5,452,416 | A | * | 9/1995 | Hilton et al. ................ | 715/783 |
| 5,796,870 | A | * | 8/1998 | Takeo .......................... | 382/232 |
| 6,154,289 | A | * | 11/2000 | Hara ............................ | 358/434 |
| 6,163,386 | A | * | 12/2000 | Kobayashi et al. ......... | 358/482 |

FOREIGN PATENT DOCUMENTS

| | | |
|---|---|---|
| JP | 55-12429 | 1/1980 |
| JP | 56-11395 | 2/1981 |
| JP | 56-11397 | 2/1981 |

\* cited by examiner

Primary Examiner—Daniel Miriam
Assistant Examiner—Seyed Azarian
(74) Attorney, Agent, or Firm—Sughrue Mion, PLLC

(57) ABSTRACT

In an image sending apparatus for sending an image input from an external apparatus, the input image is displayed on display means. In the case where the input image is unnecessary, the image can be designated as an unnecessary image and not sent. The unnecessary image is designated by moving display of accompanying information of the image to an unnecessary image list in the display means. In an image transmission information display apparatus for displaying transmission information on a screen for confirmation of a transmission status of a medical image to be sent to a plurality of addressees, an image list is displayed on the screen. After transmission processing of the medical image to all the addressees has been finished, a transmission processing end status is displayed indicating the end of the transmission processing to all the addressees, in an information display area of the image in the image list. After the transmission of the medical image to all the addressees has been completed normally, a transmission completion status is displayed, indicating the normal completion in the information display area. When the transmission of any one of the addressees was unsuccessful, an unsuccessful transmission status is displayed indicating the unsuccessful transmission to any one of the addressees, in the information display area.

19 Claims, 3 Drawing Sheets

IMAGE SENDING APPARATUS AND IMAGE TRANSMISSION INFORMATION DISPLAY APPARATUS

BACKGROUND OF THE INVENTION

1. Field of the Invention

The present invention relates to an image sending apparatus for sending an image input from an external apparatus to a predetermined addressee. The present invention also relates to an image transmission information display apparatus for displaying image transmission status information for confirmation, upon sending an image to a plurality of addressees.

2. Description of the Related Art

Radiation image recording and reproducing systems using stimulable phosphor storing a portion of energy of radiation (such as X rays, $\alpha$ rays, $\beta$ rays, $\gamma$ rays, electron rays, and ultraviolet rays) irradiated thereon and emitting light in accordance with the stored energy by being exposed to stimulating rays such as visible light have been known. In such a radiation image recording and reproducing system, information of a radiation image of a subject such as a human body is recorded on a stimulable phosphor sheet comprising a stimulable phosphor layer (the radiation image is photographed), and the stimulable phosphor sheet is scanned with the stimulating rays such as a laser beam to cause the sheet to emit the light. The light is then photoelectrically read to obtain an image signal (the radiation image is read), and the radiation image is output as a visible image on a recording medium such as a photosensitive material or on a display apparatus such as a CRT display, based on the image signal having been obtained (see Japanese Unexamined Patent Publication Nos. 55(1980)-12429, 56(1981)-11395, and 56(1981)-11397, for example).

In the case where such a radiation image recording and reproducing system is introduced to a large-scale hospital or the like, the system is installed with an image sending system in some cases. For example, a radiological ward is connected online to other wards such as a surgical ward and an internal ward, and a radiation image is photographed in the radiological ward based on a request made by any of the wards. The photographed image (an image signal) is read and input to a transmission apparatus for sending the image to a predetermined addressee such as the ward requesting the image.

Such a transmission system is configured in such a manner that a transmission apparatus automatically sends, for each medical examination, the image having been read to the predetermined addressee once the image is input to the transmission apparatus. In other words, radiation images are usually photographed for a medical examination, and the number of the images photographed in each medical examination may be one or more. In each case, medical examination information such as a medical examination number indicating which medical examination the images are for and quantity information indicating the quantity of the images photographed in the medical examination (the medical examination information may include the quantity information) are related to each image as accompanying information thereof, and input to the transmission apparatus. In the transmission apparatus, each time the images to be photographed for each medical examination are judged to have been input and ready based on the medical examination information and the quantity information, the images are collectively sent to the addressee.

The above transmission system may comprise a display apparatus such as a CRT display for displaying the images input thereto and for confirmation by a radiologist of whether or not the images are adequate. Even in such a case, image transmission is not controlled by a result of the confirmation. Therefore, even an inadequate image is included in the images for any medical examination, the images are automatically sent to the addressee once exactly the same number of images for the medical examination have been input thereto.

In such a conventional image sending system described above which automatically sends all the images for each medical examination regardless of adequacy of the images once exactly the same number of the images to be photographed for the medical examination have been input, an inadequate image a so-called faulty image having a wrong direction of photographing (from the front or from a side), or a blur caused by motion of a subject, or inadequate density or contrast is also sent automatically. Such faulty images cause problems on diagnosis through observation of the image, regardless of the fact that an adequate image is expected by the addressee.

Furthermore, in the conventional image sending system, management of unnecessary images such as faulty images is not adequate. For example, in the case where a faulty image has been generated and the image is re-photographed, the number of radiation images for each patient is not easily understood.

As has been described above, such a conventional radiation image recording and reproducing system described above is sometimes installed as a system for sending images to a plurality of addressees. For example, in the case where the system is introduced to a large-scale hospital or the like, a radiological ward carries out photographing of a radiation image based on a request made by another ward connected online to the radiological ward. The photographed radiation image is read and displayed on a display apparatus such as a screen of a CRT display. In this manner, confirmation of adequacy of the image, such as whether or not the direction of photographing is right, or whether or not a blur caused by motion of a subject is observed, or whether or not the density and contrast are adequate, becomes possible. The radiation image (an image signal) having been read is then sent to addressees such as a diagnostic workstation in the radiological ward, an image management apparatus in the radiological ward, and to the ward requesting the image.

Upon transmission of the image by such a conventional system, a radiologist issues a transmission instruction by using a transmission apparatus and the transmission apparatus simply carries out transmission processing according to the transmission instruction. Therefore, a transmission status such as whether or not the transmission is carried out successfully is not specifically displayed. If the radiologist wishes to know the transmission status, he/she operates the display apparatus and causes a queue of image output to be displayed so that he/she can confirm the status.

However, in the case where the image is sent to a plurality of addressees, all the addressees may not necessarily receive the image successfully, and a problem may occur in transmission to any addressee. Therefore, notification of the transmission status has been desired, which has not been easy by using a conventional system due to the operation of the display apparatus for display of the image output queue.

SUMMARY OF THE INVENTION

The present invention has been conceived based on consideration of the above problems. An object of the present invention is therefore to provide an image sending apparatus for confirming an image input from an external apparatus and for controlling transmission of the image based on a result of confirmation so as not to send an unnecessary image such as a faulty image.

Another object of the present invention is to provide an image sending apparatus for managing unnecessary images such as faulty images so as to enable easy understanding of an image photographing status of each patient.

In order to achieve the above objects, an image sending apparatus of the present invention is an apparatus for sending an image input from an external apparatus to a predetermined addressee, and the image sending apparatus comprises:

display means for displaying the input image;

transmission means for sending the image;

unnecessary image designating means for enabling designation of the image displayed on the display means as an unnecessary image; and transmission control means for controlling the transmission means so as not to send images that have been designated as unnecessary.

In the above image sending apparatus, the unnecessary image designating means can designate an unnecessary image by a moving display of accompanying information of the image to a list of unnecessary images on the display means.

In the above image sending apparatus, the transmission control means can control the transmission means so as not to send an image having the same examination information as an image that has been designated as an unnecessary image.

The image sending apparatus can automatically delete an image that has been designated as an unnecessary image after a predetermined time has elapsed.

The image sending apparatus can cancel designation of an unnecessary image.

As has been described above, the image sending apparatus of the present invention displays an image that has been input from the external apparatus on the display means before the image is sent to the predetermined addressee by the transmission means so that the image displayed on the display means can be confirmed. In the case where the image being displayed is an unnecessary image (an image which does not need to be sent) such as a faulty image, the image is designated as an unnecessary image and the image having been designated as an unnecessary image is not sent. Therefore, various kinds of problems which will occur if an unnecessary image such as a faulty image is sent to the addressee can be avoided.

If the unnecessary image is designated by a moving display of accompanying information of the image displayed on the display means to the list of unnecessary images, it becomes easier to grasp and manage the unnecessary image than in the case where the accompanying information of the unnecessary image is simply deleted from the display means. In the case of the image being a radiation image, management of radiation photographing on each patient also becomes possible, which is advantageous.

If an image having the same medical examination information as the image having been designated as an unnecessary image is not sent, the addressee can avoid a problem of waiting for transmission of remaining images after only a portion of images for a medical examination has been sent.

Furthermore, if an image designated as an unnecessary image is automatically deleted from storage means after a predetermined time has elapsed, memory space of the storage means can be saved from being wasted by the unnecessary image.

If cancellation of unnecessary image designation is possible after an image has once been designated as an unnecessary image, the image can be sent in the case where the image is re-judged to be adequate after being designated as an unnecessary image, for example. Therefore, convenience is improved.

Yet another object of the present invention is to provide an image transmission information display apparatus enabling easy understanding of a transmission status in the case where an image is sent to a plurality of addressees.

In order to achieve the object described above, a first image transmission information display apparatus of the present invention is an apparatus for displaying transmission information on a display screen in order to confirm a transmission status of a medical image to be sent to one or more addressees. The transmission information display apparatus comprises:

image list display control means for displaying an image list on the screen;

transmission completion detection means for outputting a transmission completion signal by detecting normal completion of transmission of the medical image to all the addressees; and transmission completion display control means for displaying, in an information display area of the image in the image list, a transmission completion status indicating normal completion of transmission of the medical image to all the addressees by receiving the transmission completion signal.

A second image transmission information display apparatus of the present invention is an image transmission information display apparatus for displaying transmission information on a display screen for confirmation of transmission status of a medical image to be sent to one or more addressees. The image transmission information display apparatus comprises:

image list display control means for displaying an image list on the screen;

transmission processing end detection means for outputting a transmission processing end signal by detecting the end of transmission processing of the medical image to all the addressees; and transmission processing end display control means for displaying, in an information display area of an image in the image list, a transmission processing end status indicating the end of the transmission processing of a medical image to all the addressees by receiving the transmission processing end signal.

A third image transmission information display apparatus of the present invention is an apparatus for displaying transmission information on a display screen for confirmation of a transmission status of a medical image to be sent to one or more addressees. The image transmission information display apparatus comprises:

image list display control means for displaying an image list on the screen;

transmission processing end detection means for outputting a transmission processing end signal by detecting the end of transmission processing of the medical image to all the addressees;

transmission completion detection means for outputting a transmission completion signal by detecting normal completion of transmission of the medical image to all the addressees;

transmission processing end display control means for displaying, in an information display area of an image in the image list, a transmission processing end status indicating the end of the transmission processing of the image to all the addressees by receiving the transmission processing end signal; and transmission completion display control means for displaying, in the information display area of the image in the image list, a transmission completion status indicating the normal completion of the transmission of the image to all the addressees, by receiving the transmission completion signal.

The image transmission information display apparatuses described above may further comprise unsuccessful transmission detection means for outputting an unsuccessful transmission signal by detecting unsuccessful transmission to any one of the addressees, and unsuccessful transmission display control means for displaying, in the information display area of the image in the image list, an unsuccessful transmission status indicating the unsuccessful transmission to any one of the addressees, by receiving the unsuccessful transmission signal.

The unsuccessful transmission status can be displayed by changing color or brightness of the information display area of an image in the image list.

The image transmission information display apparatuses may further comprise image list specifying means for specifying an information display area of any image in the image list, list display instruction means for instructing display of a transmission status list, and list display control means for displaying, in the case where an information display area of an image has been specified by the list specifying means and the transmission status list display has been instructed by the list display instruction means, a transmission status list of the image corresponding to the information display area having been specified.

The information display area of the image refers to an area of image information itself comprising characters and a pattern or the like, an area including the information itself, or an area corresponding to the information.

The display of the transmission status list refers to collectively displaying the transmission status of the image for each addressee, or the transmission status list display itself.

According to the first image transmission information display apparatus of the present invention, the image list is displayed on the screen, and the transmission completion status indicating normal completion of the transmission of an image to all the addressees is displayed in the information display area of the image in the image list, after the transmission of the image to all the addressees has been completed normally. Therefore, whether or not the image has been normally sent to all the addressees is confirmed easily and promptly by simply checking the screen.

According to the second image transmission information display apparatus of the present invention, the image list is displayed on the screen, and the transmission processing end status indicating the end of the transmission processing of an image to all the addressees can be displayed in the image display area of an image in the image list after the end of the transmission processing. Therefore, whether or not the transmission processing of the image to all the addressees has been completed can be confirmed easily and promptly, by simply checking the screen.

According to the third image transmission information display apparatus of the present invention, the image list is displayed on the screen, and the transmission processing end status indicating the end of the transmission processing of an image to all the addressees is displayed in the information display area of the image in the image list after the end of the transmission processing of the image to all the addressees. At the same time, the transmission completion status indicating normal completion of the transmission of an image to all the addressees is displayed in the information display area of the image in the image list after the transmission of the image to all the addressees has been normally completed. Therefore, whether or not the transmission processing of an image to all the addressees has been finished and whether or not the transmission of an image to all the addressees has been normally completed can be confirmed easily and promptly, by simply checking the screen.

In the image transmission information display apparatuses described above, unsuccessful transmission of an image to any one of the addressees can be confirmed easily and promptly by simply checking the screen if the apparatuses display the unsuccessful transmission status indicating unsuccessful transmission to any one of the addressees in the information display area of the image in the image list.

If the unsuccessful transmission status is displayed by changing the color or brightness of the information display area of the image in the image list, extremely important information of unsuccessful transmission can be visually and clearly displayed to a person confirming the transmission status, which leads to prevention of overlook of the information.

Furthermore, in the image transmission information display apparatuses of the present invention, if the list of the transmission status of the image corresponding to the specified information in the information display area of the image in the image list can be displayed on the screen when the display of the transmission status list is instructed, the transmission status of the image to each of the addressees can be known in detail, which leads to improvement of confirmation of the transmission status.

DESCRIPTION OF THE PREFERRED EMBODIMENTS

Hereinafter, embodiments of the present invention will be explained in detail with reference to the accompanying drawings.

Figure 1:
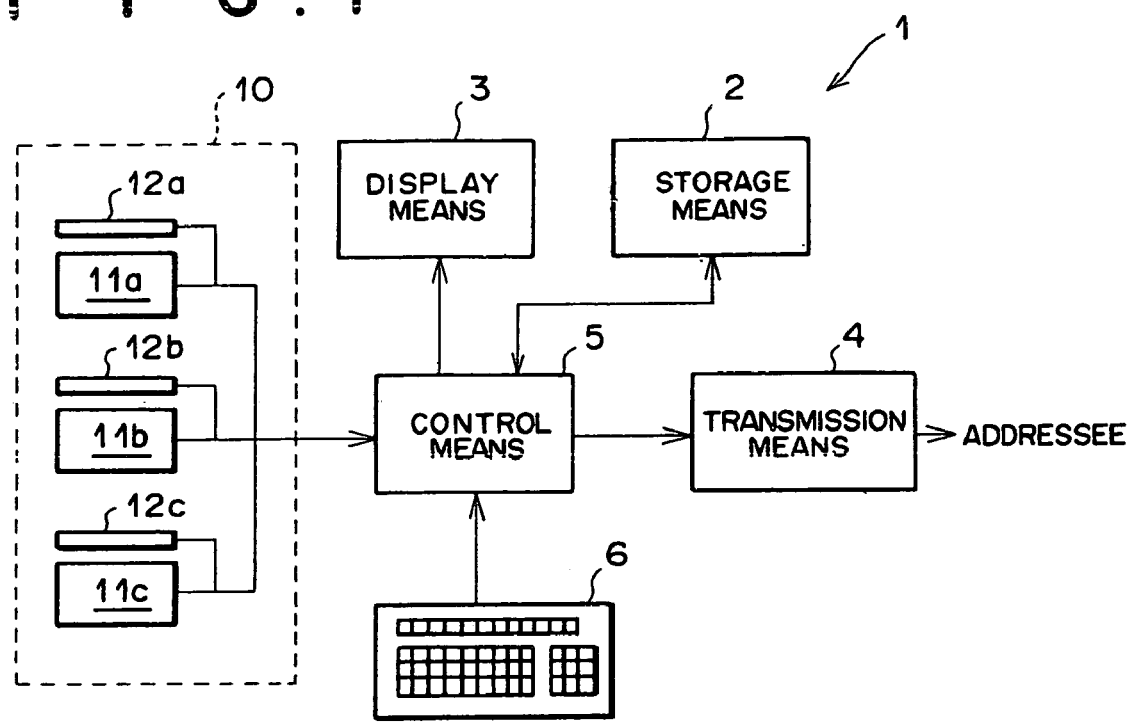
FIG. 1 is a block diagram showing an embodiment of an image sending apparatus of the present invention.
Figure 2:
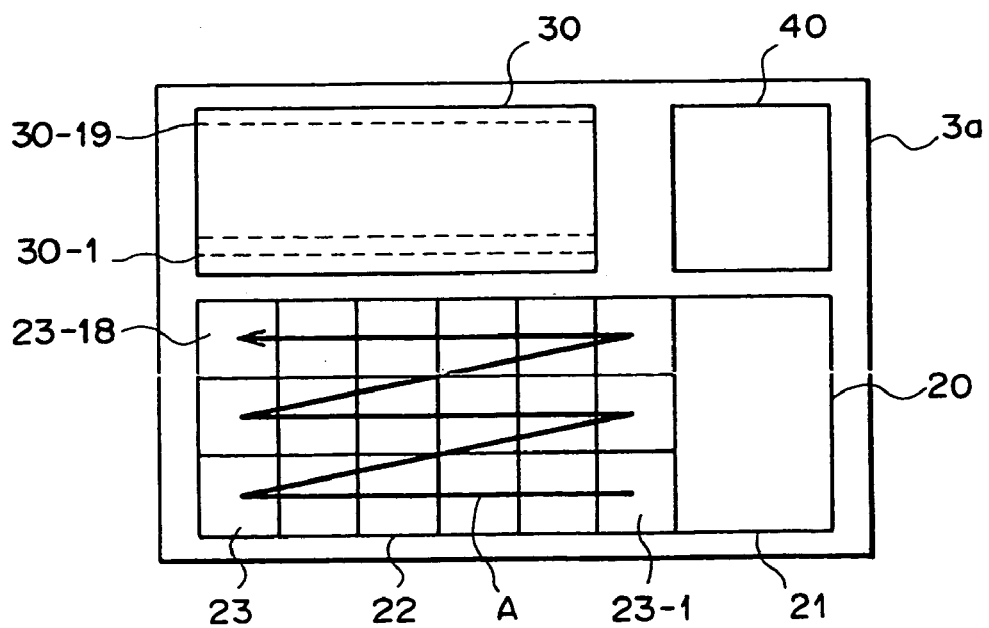
FIG. 2 is a diagram showing an enlargement of a display screen in FIG. 1.

An embodiment of an image sending apparatus of the present invention will be explained first. FIG. 1 is a block diagram showing the embodiment of the image sending apparatus, and FIG. 2 is an enlargement of a display screen of display means shown in FIG. 1.

The image sending apparatus sends a medical radiation image (an image signal) obtained by a reading apparatus which reads a radiation image of a patient recorded (photographed) on a stimulable phosphor sheet.

As shown in FIG. 1, an image sending apparatus 1 comprises storing means 2 such as an optical disc for storing an image and accompanying information thereof input from an external apparatus 10, display means 3 such as a CRT display for displaying the image and the accompanying information, transmission means 4 for sending the image and the accompanying information to a predetermined addressee, control means 5 for controlling the storing means 2, the display means 3, and the transmission means 4, and an instruction input means 6 for inputting an instruction to the control means 5. The control means 5 comprises transmission control means of the present invention.

The external apparatus 10 comprises three reading apparatuses 11a~11c installed in three respective photographing rooms each for obtaining the image (the image signal) by reading image information from a stimulable phosphor sheet on which a radiation image has been recorded, and accompanying information input apparatuses 12a~12c installed together with the respective reading apparatuses 11a~11c.

The images read by the reading apparatuses 11a~11c are input to the control means 5 of the image sending apparatus 1 while being linked with the accompanying information input from the accompanying information input apparatuses 12a~12c.

The control means 5 inputs the images and the accompanying information thereof to the storage means 2, and the storage means 2 stores the images and the accompanying information in a state where the images and the accompanying information are linked to each other, that is, related to each other.

The control means 5 generates reduced monitor images having reduced image signals and thumbnail images having a larger reduction ratio than the reduced monitor images by carrying out signal thinning processing or interpolation processing on the images having been input thereto. The control means 5 outputs these reduced images to the display means 3 together with the accompanying information thereof, and causes the display means 3 to display the images and the accompanying information.

As shown in FIG. 2, a screen 3a of the display means 3 comprises an image display area 20 for displaying the images, an image list display area 30 for displaying the accompanying information in the form of a list, and an unnecessary image list display area 40 for displaying, in the form of a list, the accompanying information of the images specified as unnecessary images. The image display area 20 comprises a monitor display area 21 for body motion conformation, and a thumbnail image display area 22 for confirming history. The thumbnail image display area 22 comprises 18 thumbnail image display frames 23 laid out in the form of a matrix.

In the screen 3a, the reduced monitor images are displayed in the monitor display area 21 while the thumbnail images are displayed in the thumbnail image display area 22. In other words, any of the images input to the control means 5 is displayed first as the reduced monitor image in the monitor display area 21 and then displayed as the thumbnail image in a first thumbnail image display frame 23-1 (a display frame in the lower right corner in FIG. 2) at the time of subsequent image input. Thereafter, the above image is displayed in one of the thumbnail image display frames 23 by shifting the frame one by one in a direction shown by an arrow A when each subsequent image is input. After the image has been moved to a last thumbnail image display frame 23-18 (a display frame in the upper left corner in FIG. 2), the image is eliminated from the display frame 23-18 and disappears from the image display area 20 at the time of subsequent image input.

The accompanying information is sequentially displayed in the image list display area 30 in the form of a list. In other words, the accompanying information of the image input to the control means 5 is displayed in a lowermost line 30-1 of the image list display area 30, and displayed in the line immediately above when the accompanying information of the subsequent image is input. Thereafter, the accompanying information is displayed while the line is shifted upward by one line at each input of the subsequent accompanying information. After the accompanying information has reached an uppermost line 30-19 of the image list display area 30, the accompanying information is eliminated from the image list display area 30 at a subsequent input of the accompanying information. The accompanying information having been eliminated from the image list display area 30 can be redisplayed in the display area 30 by scrolling the image list display area 30 based on a scrolling instruction input from the instruction input means 6 which will be explained later. Likewise, the unnecessary image list display area 40 can be scrolled.

The information accompanying an image refers to various kinds of information related to the image. What kind of accompanying information is linked with an image and input to the control means 5 and what kind of accompanying information is displayed on the display means 3 can be determined arbitrarily. In this embodiment, at least patient information, medical examination information, quantity information, and addressee information are input as the accompanying information to the control means 5 and displayed on the display means 3. Upon displaying the accompanying information on the display means 3, a portion of the accompanying information having been input may be selected and displayed. The patient information is information for identifying and specifying a patient as a subject of the image. The patient information includes the name, the date of birth, gender and an ID number of the patient, for example. The medical examination information refers to information for specifying and identifying a medical examination. The medical examination information includes a medical examination number, the kind of medical examination such as chest examination or abdomen examination, and the date of examination, for example. The quantity information is information indicating the quantity of images photographed in an examination. The addressee information is information indicating an addressee of the image. The quantity of the images photographed in each medical examination is not constant. In some cases, only one image is photographed and a plurality of images are photographed in other cases such as medical check-ups. In a medical check-up, 2 chest images (from the front and from a side) and 8 stomach images are photographed, for example. The images in the same medical examination are sent to the same addressee.

The instruction input means 6 comprising a keyboard is connected to the control means 5. In the case where a radiologist or the like has judged the image displayed in the screen 3a of the display means 3 as the unnecessary image such as a faulty image, the radiologist can designate the image as the unnecessary image by using the instruction input means 6. The instruction input means 6 comprises unnecessary image designating means of the present invention.

Any method can be used for designating an unnecessary image. In this embodiment, the unnecessary image is designated by moving display of the accompanying information of the image from the image list display area 30 to the unnecessary image list 40.

The control means 5 reads the images and the accompanying information thereof from the storing means 2, and inputs them to the transmission means 4 to cause the images and the accompanying information to be sent to the predetermined addressee. At this time, the control means 5 controls the transmission of the images and the accompanying information while taking the unnecessary image designated by the instruction input means 6 into consideration. Hereinafter, this transmission control will be explained.

The images are sent at each examination. In other words, the quantity of the images to be photographed in each medical examination is determined in advance, and the medical examination information and the quantity information is linked with each of the images to be input to the control means 5. Therefore, the control means 5 recognizes which medical examination each image is for by referring to the medical examination information thereof, and understands the quantity of the images in the medical examination by referring to the quantity information. After the control means 5 has confirmed input of all the images necessary in the examination, all the images photographed in the medical examination are collectively sent. In the case where the quantity of the image to be photographed in a medical examination is 1, the image is sent after being input. In the case where the quantity of the images in another medical examination is more than 1, 5 for example, all the 5 images are sent collectively after all the 5 images are input and ready.

In this case, after all the images to be photographed in a medical examination are input to the control means 5 and ready, if none of the images are designated as an unnecessary image in a predetermined time, all the images are sent collectively. In the case where any one of the images has been designated as an unnecessary image, the image designated is not sent and transmission of the other images having the same medical examination information as the designated image, that is, the images photographed in the same medical examination as the designated image is suspended. The control means 5 judges the addressee from the addressee information in the accompanying information and instructs the transmission means 4 not to send the images.

In the case where the image having been designated as the unnecessary image is re-photographed and input to the image sending apparatus 1 after being related to the same medical examination information, the display means 3 displays the input. In the case where an image has not been re-designated as an unnecessary image in the predetermined time after the input and the images necessary for the medical examination are ready as a result, the images are collectively sent to the addressee.

The image designated as an unnecessary image may remain in the storing means 2 or be deleted immediately. In this embodiment, the image is deleted after a predetermined time has elapsed since the designation of the unnecessary image. If the image is re-judged to be adequate before the predetermined time has elapsed, display of the accompanying information of the image can be moved from the unnecessary image list display area 40 to the image list display area 30, which enables cancellation of the unnecessary image designation. In the case where the image is deleted after the predetermined time has elapsed, the image sending apparatus 1 may inquire whether or not the image is deleted so that the image can be deleted only in the case where an operator such as the radiologist inputs an instruction to delete the image.

In the above embodiment, the images and the accompanying information thereof are input from the external apparatus. In this case, the external apparatus inputting the images may be the apparatus inputting the accompanying information or separate from the apparatus inputting the information. The images and the accompanying information are input at the same time while being linked to each other. However, the images and the accompanying information may input separately as long as display of the images and the accompanying information thereof is not affected.

The image sending apparatus 1 in the above embodiment is merely an example, and the image sending apparatus of the present invention is not limited to this embodiment. Various modifications can be made thereto within the scope of the present invention. Especially, various methods of designating the unnecessary image exist.

Furthermore, the external apparatus in the above embodiment serves as the reading apparatus for reading the image information from the stimulable phosphor sheet as well as the accompanying information input apparatus. However, the external apparatus is not limited to this example, and the present invention can be configured as an apparatus for sending radiation images input from various kinds of external apparatuses or for sending other kinds of images.

Figure 3:
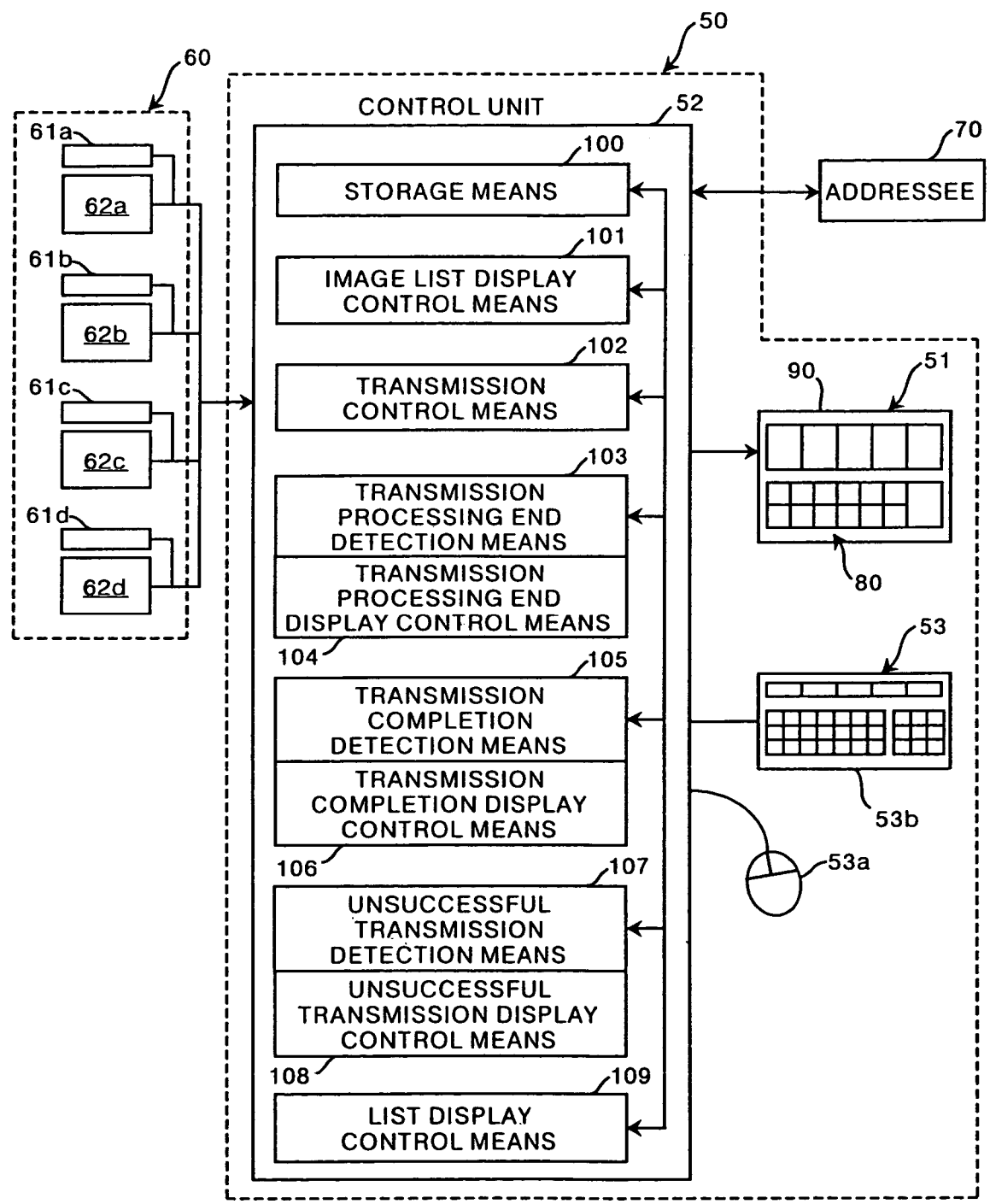
FIG. 3 is a block diagram showing an embodiment of an image transmission information display apparatus of the present invention.
Figure 4:
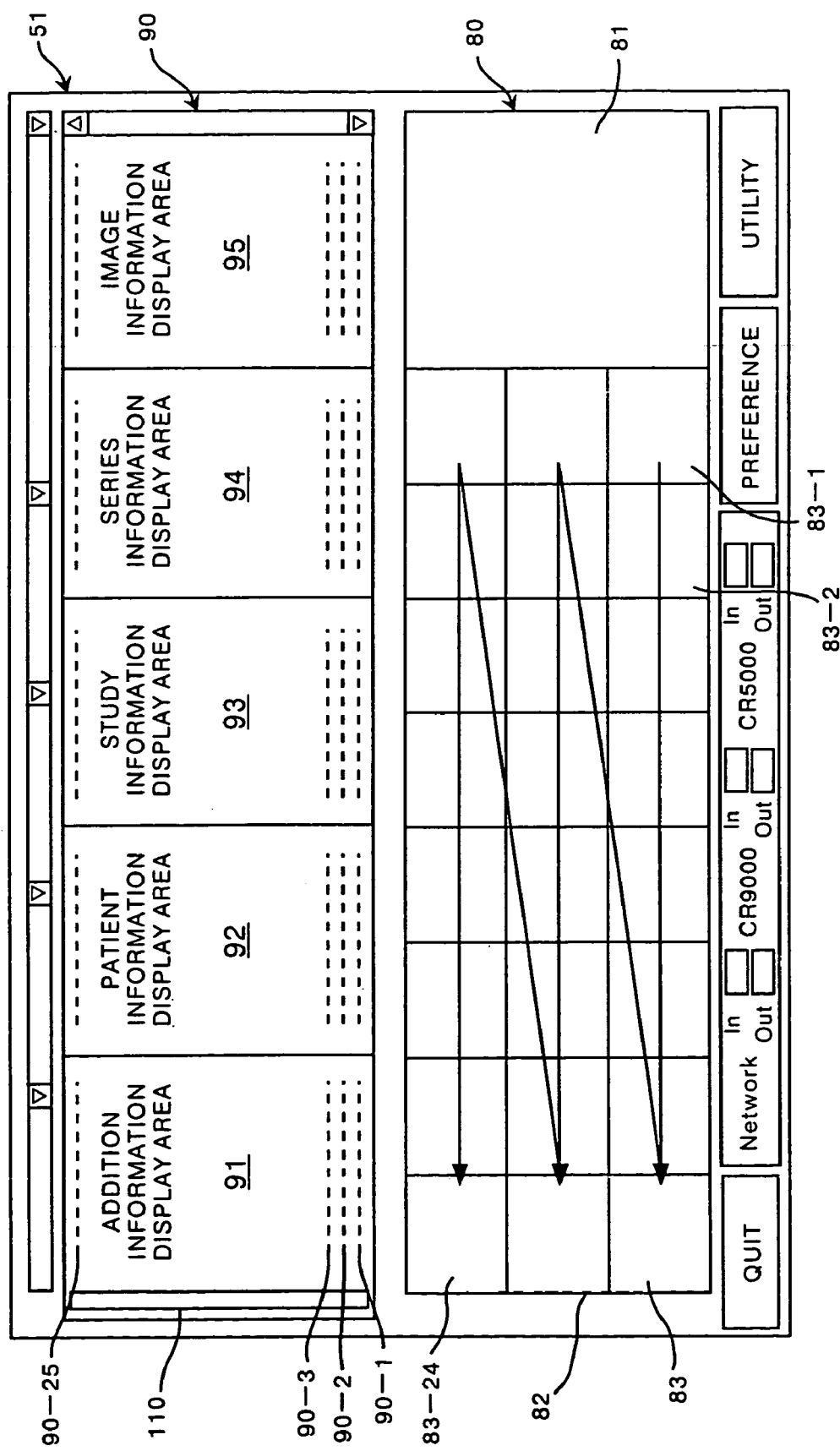
FIG. 4 is a diagram showing an enlargement of a display screen in FIG. 2.

An embodiment of an image transmission information display apparatus of the present invention will be explained next. FIG. 3 is a block diagram showing an embodiment of the image transmission information display apparatus of the present invention, and FIG. 4 is an enlargement of a screen shown in FIG. 3.

An image transmission information display apparatus 50 shown in FIG. 3 is for displaying transmission information of a medical image photographed by using a stimulable phosphor sheet, and has not only the image transmission information displaying function but also a function of sending the images. As shown in FIG. 3, the image transmission information display apparatus 50 comprises a screen 51 of display means such as a CRT display, a control unit 52 for controlling image transmission and various kinds of display in the screen 51, and instruction input means 53 for inputting various kinds of instructions regarding the image transmission and the display in the screen 51. The control unit 52 is connected to an external apparatus 60 for inputting the image (an image signal) to be sent and various kinds of accompanying information related to the image. The control unit 52 is also connected to a plurality of addressees 70 to which the image is sent.

The external apparatus 60 comprises reading apparatuses 61*a*~61*d* installed in 4 respective photographing rooms each for obtaining the image (the image signal) by reading image information from the stimulable phosphor sheet on which a radiation image has been recorded, and accompanying information input apparatuses 62*a*~62*d* installed together with the respective reading means 61*a*~61*d*. The images (image signals) read by the reading apparatuses 61*a*~61*d* are input to the control unit 52 while being linked with the accompanying information input from the accompanying information input apparatuses 62*a*~62*d*.

The screen 51 comprises an image display area 80 for displaying the images input from the external apparatuses 60 (the images based on the image signals input from the external apparatus 60) and accompanying information display area 90 for displaying the accompanying information input from the external apparatus 60. An image list in the present invention is displayed in the accompanying information display area 90. In other words, in this embodiment, the image list in the present invention refers to a list of the accompanying information of each of the images is displayed in the form of a list in the accompanying information display area 90 which will be explained below in detail. An area at which the accompanying information of each image is displayed is an information display area of the image list in the present invention.

The image display area 80 comprises a monitor display area 81 for confirming body motion, and a thumbnail image display area 82 for history confirmation, as shown in FIG. 4. The thumbnail image display area 82 has 24 thumbnail image display frames 83 laid out in the form of a matrix.

As shown in FIG. 4, the accompanying information display area 90 is divided into 5 display areas, that is, an additional information display area 91, a patient information display area 92, a medical examination information display area 83, a series information display area 84, and an image unit information display area 95.

The accompanying information refers to information related to each of the images. The accompanying information to be displayed can be determined freely. In this embodiment, the additional information, the patient information, the medical examination information, the series information, and the image unit information which comprise the accompanying information are shown in the display areas 91~95. The additional information is information not relevant to the information in the other display areas, such as the name of a radiologist having photographed the image and the photographing room in which the image has been photographed. The patient information refers to information related to a patient as a subject of the image, such as the name, the date of birth, and gender of the patient. The medical examination information refers to information related to a medical examination. The medical examination information includes the kind of medical examination such as chest examination and abdomen examination, and the date of examination, for example. The series information refers to information regarding a series of images, and includes a series number indicating which series the image belongs to and the date of photographing of the series, for example. The series of images refers to a group of images photographed at one time. For example, in the case of a medical check-up, 2 chest images (from the front and from a side) and 8 stomach images are photographed, and the 2 chest images and the 8 stomach images comprise one series. The image unit information is information related to each image unit, that is, information based on each image. The image unit information includes the name of a photographing menu, and a standardization condition of the image, for example.

When the images (image signals) and the accompanying information thereof are input from the external apparatus 60 to the control unit 52, the images and the information are stored in storage means 100 in the control unit 52 by being linked to each other, that is, by being related to each other. At the same time, image list display control means 101 of the control unit 52 carries out image reduction processing for generating reduced images by reducing the number of the image signals through signal thinning processing or interpolation processing on the images having been input. In this manner, reduced monitor images and thumbnail images having a larger reduction ratio than the monitor images are generated by the image list display control means 101, and sequentially input to the monitor display area 81 and the thumbnail image display area 82 to be displayed therein. The accompanying information is sequentially displayed in the accompanying information display area 90 in the form of a list.

More specifically, when a first image and a first accompanying information piece which is the accompanying information to be linked with the first image are input, the first image and the first accompanying information piece are stored in the storage means 100 while being linked to each other. The image list display control means 101 generates a reduced monitor image to be displayed in the monitor area 81 by reducing the first image, and displays the first accompanying information piece in a lowermost line 90-1 in the accompanying information display area 90.

When a second image and a second accompanying information piece are input, the second image and the second accompanying information piece are stored in the storing means 100 by being linked to each other, and the image list display control means 101 generates a reduced monitor image to be displayed in the monitor display area 81 by reducing the second image having been input. At the same time, the image list display control means 101 generates a thumbnail image of the first image to be displayed in a first frame 83-1 in the thumbnail image display area 22 by reducing the first image while displaying the second accompanying information piece in the lowermost line 90-1 in the accompanying information display area 90. The image list display control means 101 shifts the first accompanying information piece to a line 90-2 immediately above the lowermost line.

Thereafter, each time a new image is input, the same procedure is repeated. A reduced monitor image of a latest image is displayed in the monitor display area 81 while the thumbnail images of the preceding images are displayed by shifting the frames one by one in the direction of an arrow. Meanwhile, a latest piece of the accompanying information is displayed in the lowermost line 90-1 of the accompanying information display area 90 while the preceding accompanying information pieces are displayed by shifting the lines one by one.

After the thumbnail image of the first image has been shifted to a 24th frame 83-24 and the accompanying information thereof has been shifted to an uppermost line 90-25 in the accompanying information display area 90, the thumbnail image displayed in the last frame 83-24 is eliminated from the thumbnail image display area 82 and disappears from the screen 51. Meanwhile, the accompanying information piece displayed in the uppermost line 90-25 is also eliminated from the accompanying information display area 90 and disappears from the screen 51.

The accompanying information piece of each image is displayed in one line, and the additional information, the patient information, the medical examination information, the series information, and the image unit information is displayed in the additional information display area 91, the patient information display area 92, the medical examination information display area 93, the series information display area 94, and the image unit information display area 95, respectively.

A mouse 53*a* or a keyboard 53*b* comprising the instruction input means 53 has a function of inputting a scrolling instruction. When the scrolling instruction is input from the instruction input means 53 to the control unit 52, the image list display control means 101 redisplays in the accompanying information display area 90 the accompanying information piece having been eliminated from the accompanying information display area 90, by scrolling the accompanying information display area 90.

The control unit 52 comprises transmission control means 102 for controlling transmission processing of the images (the image signals) and the accompanying information thereof. After the images and the accompanying information thereof are input from the external apparatus 60 to the control unit 52 and displayed on the screen 51, a transmission operator such as a radiologist or the like having photographed the images confirms on the screen 51 the images to be sent. When the operator judges that there are no problems, the operator inputs instructions for specifying the images to be sent and the addressees, and a transmission instruction by using the instruction input means 53. The transmission control means 102 carries out transmission processing for sending each of the images and the accompanying information thereof to each of the addressees, based on the instruction. In this embodiment, a transmission status for each of the addressees is displayed in the screen 51.

Hereinafter, the display of the transmission status will be explained.

The control unit 52 comprises transmission processing end detection means 103 and transmission processing end display control means 104. When the transmission processing to all the addressees having been instructed is finished, the transmission processing end detection means 103 detects the end of processing and outputs a transmission processing end signal. The transmission processing end display control means 104 receives the transmission processing end signal, and displays a transmission processing end status indicating the end of the transmission processing to all the addressees in the information display area of each of the images in the image list. More specifically, a transmission information display area 110 is set in a left end portion of the accompanying information display area 90 (a left end of the additional information display area 91), and a transmission processing end mark indicating the end of the transmission processing is displayed in a left end portion in the display area 110 in a line where the accompanying information of each of the images is being displayed.

The end of transmission processing refers to completion of the transmission processing to the predetermined addressees according to the transmission instruction, regardless of whether the transmission of each of the images was successful or not. In other words, the end of the transmission processing means not only the case where the transmission processing ended successfully but also the case where the transmission processing ended unsuccessfully due to a failure or power down of any of the addressees, for example.

The transmission control unit 52 further comprises transmission completion detection means 105 and transmission completion display control means 106. When the transmission of each of the images to all the addressees having been instructed is completed successfully, the transmission completion detection means 105 detects the completion and outputs a transmission completion signal. The transmission completion display control means 106 receives the transmission completion signal and displays a transmission completion status in the information display area of each of the images in image list, indicating successful transmission to all the addressees. More specifically, a transmission completion mark as the transmission completion status indicating the completion of the transmission is displayed in a leftmost portion in the transmission information display area 110 in a line where the accompanying information of each of the images is being displayed.

The transmission completion mark may be displayed together with the transmission processing end mark. Alternatively, the transmission completion mark may be displayed alone, since the transmission processing has obviously been finished in the case where the transmission completion mark is displayed.

The control unit 52 further comprises unsuccessful transmission detection means 107 and unsuccessful transmission display control means 108. When the transmission processing to all the addressees instructed is finished unsuccessfully for any one of the addressees due to a failure or power down of the addressee or the like, the unsuccessful transmission detection means 107 detects the fact and outputs an unsuccessful transmission signal. The unsuccessful transmission display control means 108 receives the unsuccessful transmission signal and displays, in the information display area of the image in the image list, an unsuccessful transmission status indicating the transmission was not successful for at least one of the addressees. More specifically, the display is carried out by changing color or brightness of the accompanying information of the image whose transmission was unsuccessful.

The control unit 52 further comprises list display control means 109. If the accompanying information display area of any one of the images in the image list is specified by the instruction input means 53 serving as image list specifying means and list display instruction means, and if display of a list of transmission status is instructed, the list display control means 109 displays in the screen 51 the list of transmission status of the image corresponding to the accompanying information piece having been specified (the image related to the accompanying information piece). More specifically, when the accompanying information display area is specified and the list display of the transmission status is instructed, the list display control means 109 opens a window in the screen 51 and displays the list of transmission status to all the addressees of the image corresponding to the accompanying information display area having been specified, such as transmission completion, being sent, and unsuccessful transmission.

In the above embodiment, the list of the accompanying information of the images is used as the image list. However, any list of information by which each image can be specified may be used as the image list of the present invention, and the information is not limited to the accompanying information described above.

In the above embodiment, displays of the transmission processing end status, the transmission completion status, and the unsuccessful transmission status are carried out in combination. However, any one of these displays may be used alone. The unsuccessful transmission display is preferably used in combination with the transmission processing end display.

Furthermore, in the above embodiment, the transmission processing end status and the transmission completion status are shown by displaying the transmission processing end mark and the transmission completion mark in the information display area 110 in the leftmost portion of the line of the accompanying information display area of each image, and the unsuccessful transmission status is displayed by changing the color or brightness of the accompanying information of the image. However, where and how to display the transmission information are not limited to the above example. Any method and any position in the screen can be used as long as the transmission processing end status, the transmission completion status, or the unsuccessful transmission status is displayed in a portion (information display area) corresponding to the information display of the image to be sent.

Moreover, the present invention is applicable to not only the transmission of the images recorded on the stimulable phosphor sheets but also transmission of images of other kinds.

In addition, all of the contents of Japanese Patent Application Nos. 11(1999)-289681 and 11(1999)-356099 are incorporated into this specification by reference.

What is claimed is:

1. An image sending apparatus for sending an image input from an external apparatus to a predetermined addressee, the image sending apparatus comprising;
    display means for displaying the image having been input;
    transmission means for sending the image to the predetermined addressee;
    unnecessary image designating means for enabling designation of the image displayed on the display means as an unnecessary image; and
    transmission control means for controlling the transmission means so as not to send the image having been designated as the unnecessary image,
    wherein the unnecessary image designating means carries out the designation of the unnecessary image by moving display of accompanying information of the image to an unnecessary image list on the display means.

2. An image sending apparatus as claimed in claim 1, wherein the transmission control means controls the transmission means so as not to send an image having medical examination information which is the same as medical examination information of the image having been designated as the unnecessary image.

3. An image sending apparatus as claimed in claim 1, wherein the image having been designated as the unnecessary image is automatically deleted after a predetermined time has elapsed.

4. An image sending apparatus as claimed in claim 1, wherein the designation of the image as the unnecessary image can be cancelled.

5. An image transmission information display apparatus for displaying transmission information on a display screen for confirmation of a transmission status of a medical image to be sent to one or more addressees, the image transmission information display apparatus comprising:
    image list display control means for displaying an image list on the screen;
    transmission completion detection means for outputting a transmission completion signal by detecting normal completion of transmission of the medical image to all the addressees; and
    transmission completion display control means for displaying, in an information display area of the image in the image list, a transmission completion status indicating the normal completion of the transmission of the medical image to all the addressees by receiving the transmission completion signal.

6. An image transmission information display apparatus for displaying transmission information on a display screen for confirmation of a transmission status of a medical image to be sent to one or more addressees, the image transmission information display apparatus comprising:
    image list display control means for displaying an image list on the screen;
    transmission processing end detection means for outputting a transmission processing end signal by detecting the end of transmission processing of the medical image to all the addressees; and
    transmission processing end display control means for displaying, in an information display area of the image in the image list, a transmission processing end status indicating the end of the transmission processing of the medical image to all the addressees by receiving the transmission processing end signal.

7. An image transmission information display apparatus for displaying transmission information on a display screen for confirmation of a transmission status of a medical image to be sent to one or more addressees, the image transmission information display apparatus comprising:
    image list display control means for displaying an image list on the screen;
    transmission processing end detection means for outputting a transmission processing end signal by detecting the end of transmission processing of the medical image to all the addressees;
    transmission completion detection means for outputting a transmission completion signal by detecting normal completion of transmission of the medical image to all the addressees;
    transmission processing end display control means for displaying, in an information display area of the image in the image list, a transmission processing end status indicating the end of the transmission processing of the image to all the addressees by receiving the transmission processing end signal; and
    transmission completion display control means for displaying, in the information display area of the image in the image list, a transmission completion status indicating the normal completion of the transmission of the image to all the addressees, by receiving the transmission completion signal.

8. An image transmission information display apparatus as claimed in any one of claims 5 to 7, further comprising:
    unsuccessful transmission detection means for outputting an unsuccessful transmission signal by detecting unsuccessful transmission to any one of the addressees; and
    unsuccessful transmission display control means for displaying, in the information display area of the image in the image list, an unsuccessful transmission status indicating failure of transmission to any one of the addressees, by receiving the unsuccessful transmission signal.

9. An image transmission information display apparatus as claimed in claim 8, wherein the unsuccessful transmission status can be displayed by changing color or brightness of the information display area of the image in the image list.

10. An image transmission information display apparatus as claimed in any one of claims 5 to 7, further comprising:
    image list specifying means for specifying an information display area of any image in the image list;
    list display instruction means for instructing display of a transmission status list; and
    list display control means for displaying, in the case where an information display area of an image has been specified by the list specifying means and the transmission status list display has been instructed by the list display instruction means, transmission status list of the image corresponding to the information display area having been specified.

11. The image sending apparatus as claimed in claim 1, wherein the display means comprises a screen including an unnecessary image list display area, which displays a list of accompanying information of the unnecessary image.

12. The image sending apparatus as claimed in claim 11, wherein the screen further includes a thumbnail image display area including a plurality of thumbnail image display frames.

13. The image sending apparatus as claimed in claim 2, wherein the display means comprises a screen including a thumbnail image display area including a plurality of thumbnail image display frames.

14. The image sending apparatus as claimed in claim 2, wherein the transmission means sends the image to the predetermined addressee from among a plurality of addressees.

15. The apparatus of claim 5 wherein the transmission detection means outputs the transmission completion signal upon detecting normal completion of the medical image to multiple addressees.

16. The apparatus of claim 14, wherein the plurality of addressees are located in physical sites remote from each other.

17. The apparatus of claim 15 wherein the multiple addressees are located in physical sites remote from each other.

18. The apparatus of claim 14 wherein the plurality of addressees are inter-connected by a network, and the unnecessary image comprises an entire image read-out from the external apparatus.

19. The apparatus of claim 15 wherein the multiple addressees are inter-connected by a network.

* * * * *